(12) United States Patent
Mahama et al.

(10) Patent No.: US 12,726,985 B2
(45) Date of Patent: Sep. 1, 2026

(54) PHYSICAL UPLINK CONTROL CHANNEL (PUCCH) AND SOUNDING REFERENCE SIGNAL (SRS) RESOURCE ALLOCATION IN SUBBAND FULL DUPLEX (SBFD)

(71) Applicant: MediaTek Singapore Pte. Ltd., Singapore (SG)

(72) Inventors: Sumaila Anning Mahama, Cambridge (GB); Mohammed S Aleabe Al-Imari, Cambridge (GB); Jozsef Gabor Nemeth, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 81 days.

(21) Appl. No.: 18/455,228

(22) Filed: Aug. 24, 2023

(65) Prior Publication Data

US 2024/0107541 A1 Mar. 28, 2024

Related U.S. Application Data

(60) Provisional application No. 63/375,878, filed on Sep. 16, 2022.

(51) Int. Cl.
*H04W 72/21* (2023.01)
*H04L 5/00* (2006.01)
*H04L 5/14* (2006.01)

(52) U.S. Cl.
CPC ........... *H04W 72/21* (2023.01); *H04L 5/0051* (2013.01); *H04L 5/14* (2013.01)

(58) Field of Classification Search
None
See application file for complete search history.

(56) References Cited

U.S. PATENT DOCUMENTS

2021/0360664 A1* 11/2021 Fakoorian ......... H04W 72/1273
2023/0292304 A1* 9/2023 Oh ........................ H04L 5/1469
(Continued)

FOREIGN PATENT DOCUMENTS

CA 3067089 A1 * 4/2019 ........... H04L 5/0048
WO WO-2024032968 A1 * 2/2024 ........ H04W 72/0446
(Continued)

OTHER PUBLICATIONS

CA_3067089_A1_I-Translation of Wang document (Year: 2019).*
(Continued)

*Primary Examiner* — Nicholas Sloms
(74) *Attorney, Agent, or Firm* — Andy M. Han; Han IP PLLC

(57) ABSTRACT

Mechanisms of uplink resource allocation in a subband full duplex (SBFD) system for transmissions of physical uplink control channel (PUCCH) and sounding reference signal (SRS) are disclosed. A PUCCH or SRS resource configuration can be received from a base station in the SBFD system. The PUCCH or SRS resource configuration can indicate, or provide parameters of, a first frequency domain starting position for PUCCH or SRS transmissions in SBFD slots and a second frequency domain position for PUCCH transmissions in non-SBFD slots. Periodic or semi-persistent PUCCH or SRS transmissions can be performed across multiple slots including SBFD slots and non-SBFD slots based on the PUCCH or SRS resource configuration. The periodic or semi-persistent PUCCH or SRS transmissions across the SBFD slots use the first frequency domain starting position. The periodic or semi-persistent PUCCH or SRS transmissions across the non-SBFD slots use the second frequency domain starting position.

21 Claims, 7 Drawing Sheets

(56) References Cited

U.S. PATENT DOCUMENTS

| | | | | |
|---|---|---|---|---|
| 2023/0336276 | A1* | 10/2023 | Elshafie | H04B 7/0658 |
| 2024/0014849 | A1* | 1/2024 | Wang | H04B 1/713 |
| 2024/0049199 | A1* | 2/2024 | Abotabl | H04W 72/23 |
| 2024/0089071 | A1* | 3/2024 | Abdelghaffar | H04L 5/0053 |
| 2024/0372661 | A1* | 11/2024 | Park | H04L 5/0044 |
| 2025/0007642 | A1* | 1/2025 | You | H04L 5/00 |
| 2025/0203583 | A1* | 6/2025 | Nemeth | H04L 5/0044 |
| 2025/0344086 | A1* | 11/2025 | Shim | H04J 11/0026 |

FOREIGN PATENT DOCUMENTS

| | | | | |
|---|---|---|---|---|
| WO | WO-2024034440 | A1 * | 2/2024 | H04L 5/0048 |
| WO | WO-2024035026 | A1 * | 2/2024 | H04L 5/0094 |

OTHER PUBLICATIONS

WO_2024035026_A1_I-Translation of You document (Year: 2024).*
WO_2024035026_A1_I_English_Translation (Year: 2024).*
Priority document for PCT KR2023/011557, KR 10-2022-0100634 (Year: 2022).*

* cited by examiner

TABLE 6.4.1.4.3-1: SRS BANDWIDTH CONFIGURATION.

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |

FIG. 7 --Prior Art--

PHYSICAL UPLINK CONTROL CHANNEL (PUCCH) AND SOUNDING REFERENCE SIGNAL (SRS) RESOURCE ALLOCATION IN SUBBAND FULL DUPLEX (SBFD)

INCORPORATION BY REFERENCE

This present application claims the benefit of U.S. Provisional Application No. 63/375,878, "PUCCH and SRS Resource Allocation in SBFD" filed on Sep. 16, 2022, which is incorporated herein by reference in its entirety.

TECHNICAL FIELD

The present disclosure relates to frequency resource allocation for uplink transmissions in a wireless communication system employing a subband full duplex (SBFD) scheme.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Time division duplex (TDD) uses one carrier with flexible uplink (UL) and downlink (DL) ratios to meet asymmetric requirements for UL and DL. However, with a DL heavy TDD configuration, such as 4 DL slots and 1 UL slot for every TDD period, a network may provide a limited allocation of time domain resources for UL, resulting in reduced UL throughput and coverage as well as increased latency. In non-overlapping subband full duplex (SBFD) at base station side, an UL subband can be introduced within DL slots of a TDD period. Accordingly, UL reception and DL transmission can be performed simultaneously for a base station within a channel across UL and DL subbands coexisting in the original DL slots.

SUMMARY

Aspects of the disclosure provide a method of uplink resource allocation in a subband full duplex (SBFD) system. The method can include receiving a physical uplink control channel (PUCCH) resource configuration from a base station in the SBFD system. The PUCCH resource configuration can indicate a first frequency domain starting position for PUCCH transmission in SBFD slots and a second frequency domain position for PUCCH transmission in non-SBFD slots. The method can further include performing periodic or semi-persistent PUCCH transmissions across multiple slots including SBFD slots and non-SBFD slots based on the PUCCH resource configuration received from the base station. The periodic or semi-persistent PUCCH transmissions across the SBFD slots use the first frequency domain starting position. The periodic or semi-persistent PUCCH transmissions across the non-SBFD slots use the second frequency domain starting position.

In an embodiment, the PUCCH resource configuration indicates one or more PUCCH resources, and the first frequency domain starting position and the second frequency domain starting position are provided in one of the one or more PUCCH resources. In an embodiment, the PUCCH resource configuration indicates a PUCCH resource set including separate PUCCH resources corresponding to SBFD slots and non-SBFD slots, respectively, and the first frequency domain starting position and the second frequency domain starting position are provided in the separate PUCCH resources included in the PUCCH resource set. In an embodiment, the SBFD slots and the non-SBFD slots in the multiple slots are configured as part of a SBFD layout configuration, indicated by high-layer parameters, or indicated using a bitmap.

In an embodiment, the PUCCH resource configuration further indicates a first second hop frequency domain starting position for the PUCCH transmission in SBFD slots and a second hop frequency domain position for the PUCCH transmission in non-SBFD slots. The periodic or semi-persistent PUCCH transmissions across the SBFD slots use the first second hop frequency domain starting position, and the periodic or semi-persistent PUCCH transmissions across the non-SBFD slots use the second hop frequency domain starting position. In an embodiment, the first second hop frequency domain starting position and the second hop frequency domain position are provided in a same PUCCH resource or in separate PUCCH resources in a same PUCCH resource set.

In an embodiment, the performing includes skipping a PUCCH frequency hopping for a SBFD slot during periodic or semi-persistent PUCCH transmissions across SBFD slots and non-SBFD slots. In an embodiment, the method can further include skipping a PUCCH transmission for a SBFD slot during periodic or semi-persistent PUCCH transmissions across SBFD slots and non-SBFD slots.

In an embodiment, the method can further include performing PUCCH repetition transmissions across multiple consecutive slots including SBFD slots and non-SBFD slots based on the PUCCH resource configuration received from the base station, the PUCCH repetition transmissions across the SBFD slots using the first frequency domain starting position, the PUCCH repetition transmissions across the non-SBFD slots using the second frequency domain starting position.

In an embodiment, the PUCCH resource configuration further indicates a first second hop frequency domain starting position for the PUCCH transmission in SBFD slots and a second hop frequency domain position for the PUCCH transmission in non-SBFD slots. The PUCCH repetition transmissions across the SBFD slots use the first second hop frequency domain starting position, and the PUCCH repetition transmissions across the non-SBFD slots use the second hop frequency domain starting position.

In an embodiment, the method can further include skipping a repetition of a PUCCH transmission in a SBFD slot during PUCCH repetition transmissions across SBFD slots and non-SBFD slots. In an embodiment, the skipping includes postponing the repetition of the PUCCH transmission to a non-SBFD slot.

In an embodiment, the method can further include receiving a PUCCH resource configuration including a PUCCH resource and a replacement PUCCH resource both having a same identifier; using one of the PUCCH resource and the replacement PUCCH resource for PUCCH transmission in non-SBFD slots; and using the other one of the PUCCH resource and the replacement PUCCH resource for PUCCH transmission in SBFD slots.

Aspects of the disclosure can further provide another method. The method can include receiving a sounding reference signal (SRS) configuration from a base station in a SBFD system. The SRS configuration indicates a first set of parameters to configure a first frequency domain starting position of SRS transmission in SBFD slots and a second set of parameters to configure a second frequency domain starting position of SRS transmission in non-SBFD slots. Periodic or semi-persistent SRS transmissions can be performed across multiple slots including SBFD slots and non-SBFD slots based on the SRS configuration received from the base station. The periodic or semi-persistent SRS transmissions across the SBFD slots use the first frequency domain starting position configured according to the first set of parameters. The periodic or semi-persistent SRS transmissions across the non-SBFD slots use the second frequency domain starting position configured according to the second set of parameters.

In an embodiment, the SRS configuration indicates an SRS resource, and the first set of parameters to configure the first frequency domain starting position of SRS transmission in SBFD slots and the second set of parameters to configure the second frequency domain starting position of SRS transmission in non-SBFD slots are provided in the SRS resource.

In an embodiment, the SRS resource provides two frequency domain position parameters corresponding to the first set of parameters to configure the first frequency domain starting position of SRS transmission in SBFD slots and the second set of parameters to configure the second frequency domain starting position of SRS transmission in non-SBFD slots, respectively.

In an embodiment, the SRS resource provides two frequency domain shift parameters corresponding to the first set of parameters to configure the first frequency domain starting position of SRS transmission in SBFD slots and the second set of parameters to configure the second frequency domain starting position of SRS transmission in non-SBFD slots, respectively.

In an embodiment, the SRS resource provides two frequency hopping parameters corresponding to the first set of parameters to configure the first frequency domain starting position of SRS transmission in SBFD slots and the second set of parameters to configure the second frequency domain starting position of SRS transmission in non-SBFD slots, respectively.

In an embodiment, the SRS configuration indicates an SRS resource set including separate SRS resources corresponding to SBFD slots and non-SBFD slots, respectively, and the first set of parameters to configure the first frequency domain starting position of SRS transmission in SBFD slots and the second set of parameters to configure the second frequency domain starting position of SRS transmission in non-SBFD slots are provided in the separate SRS resources included in the SRS resource set.

In an embodiment, the method can further include skipping an SRS transmission for a SBFD slot during periodic or semi-persistent SRS transmissions across SBFD slots and non-SBFD slots. In an embodiment, the method can further include skipping SRS transmission on resource blocks that are not confined with an uplink subband in a SBFD slot for an SRS having frequency domain resources partially within the uplink subband and partially overlapping a downlink subband in the SBFD slot.

In an embodiment, for a set of physical resource blocks allocated in an uplink subband in a SBFD slot in the multiple slots, a common resource block (CRB) index of a first PRB and a CRB index following a last PRB are divisible by four.

BRIEF DESCRIPTION OF THE DRAWINGS

Various embodiments of this disclosure that are proposed as examples will be described in detail with reference to the following figures, wherein like numerals reference like elements, and wherein:

FIG. 7 shows a portion of Table 6.4.1.4.3-1 in TS 38.211.

DETAILED DESCRIPTION OF EMBODIMENTS

I. Subband Full Duplex (SBFD) Operation

Figure 1:
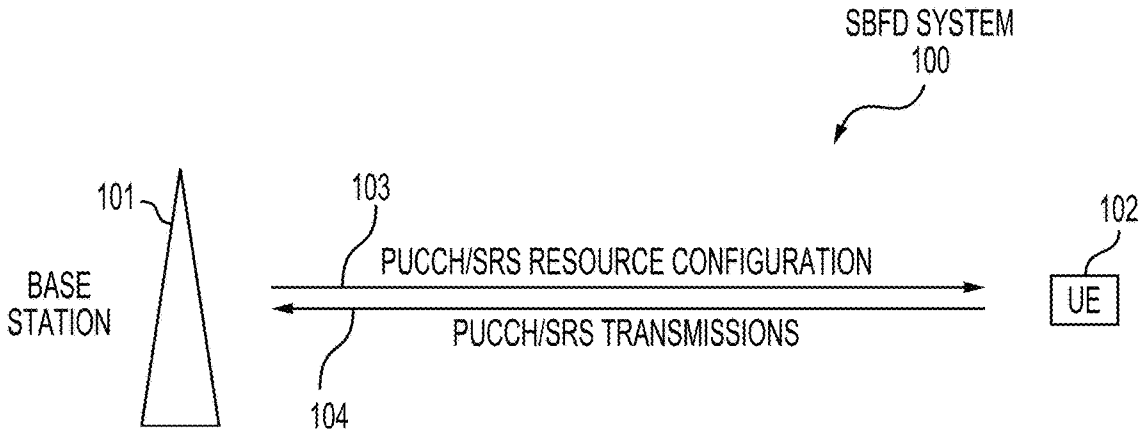
FIG. 1 shows a wireless communication system 100 according to an embodiment of the disclosure.

FIG. 1 shows a wireless communication system 100 according to an embodiment of the disclosure. The system 100 can include a base station (BS) 101 and a user equipment (UE) 102. The BS 101 and the UE 102 can generally operate according to the communication standards developed by the 3rd Generation Partnership Project (3GPP) or other wireless communication protocols.

Figure 2:
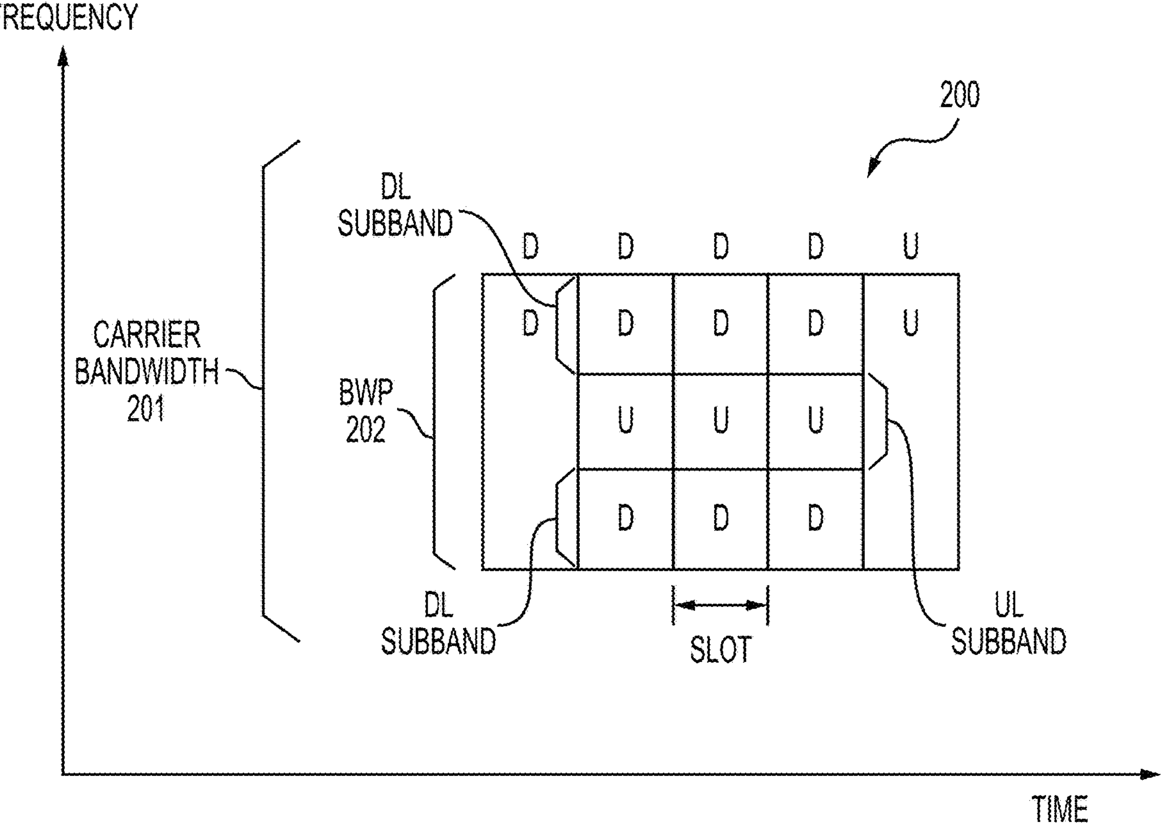
FIG. 2 shows a layout 200 of time-frequency radio resource allocation for subband full duplex (SBFD) operation in a serving cell of the UE 102.

The BS 101 can operate in a non-overlapping subband full duplex (SBFD) mode. To explain the SBFD mode, FIG. 2 shows a layout 200 of time-frequency radio resource allocation for SBFD operation in a serving cell of the UE 102. For example, the UE 102 can be configured with a bandwidth part (BWP) 202 within a carrier bandwidth 201. The UE 102 can also receive a SBFD-related configuration indicating the layout 200 of time-frequency radio resource allocation. The layout 200 of time-frequency radio resource allocation can be based on a time division duplex (TDD) uplink (UL)/downlink (DL) configuration having a 5-slot time domain pattern of [D D D D U], where D represents a DL slot and U represents an UL slot. A set of subbands are introduced in the DL slots. For example, according to the configuration, for each of the middle three DL slots, the frequency resources can be partitioned into 2 DL subbands and 1 UL subband, as shown in FIG. 2.

With the introduction of the UL subbands into the original DL slots, the BS 101 can operate in the so-called SBFD mode during these partitioned slots: DL transmission and UL reception can be conducted in the DL subbands and UL subbands, respectively and simultaneously. The partitioned slots can be referred to as SBFD slots. The first full DL slot and the last full UL slot shown in FIG. 2 can be referred to as non-SBFD slots. On the layout shown in FIG. 2, D indicates the respective radio resources configured for DL transmissions, and U indicates the respective radio resources configured for UL transmissions. In the SBFD slots, the UE 102 can operate in full duplex or half duplex, for example, depending on the capability of the UE 102.

In operation, as shown in FIG. 1, the UE 102 may perform uplink transmissions 104 based on resource configurations 103 received from the BS 101. For example, the uplink transmissions 104 can include transmissions of physical uplink control channel (PUCCH), sounding reference signal (SRS), and other physical channels or signals. The uplink transmissions can be periodic, semi-persistent, or aperiodic. Some of the uplink transmissions 104 can be repetitive across multiple continuous slots. Some of the uplink transmissions 104 may employ frequency hopping.

The uplink configuration 103 can indicate frequency domain locations of the radio resources for the uplink transmissions 104. However, in the specification of existing 3GPP standards, the frequency domain locations can be defined with respect to the BWP 202 without considering the newly introduced UL subbands. For example, a frequency domain position of a PUCCH resource can be indicated by a physical resource block (PRB) index defined according to the number of PRBs in the BWP 202. Typically, the PUCCH resources are allocated to be near the edges of the respective BWP 202. For a periodic or semi-persistent PUCCH transmission or PUCCH repetition across both types of slots (SBFD slots and non-SBFD slots), it is possible that the such-defined PUCCH resources are out of the UL subbands when the PUCCH transmissions take place in the SBFD slots. Similar problems exist with SRS transmissions.

Aspects of the disclosure provide solutions for solving the above problem. For example, separate frequency domain resource allocations (FDRA) can be provided for the two types of slots in a multi-slot UL transmission in SBFD. One FDRA is defined for non-SBFD slots, whereas the other FDRA is defined for SBFD slots/symbols. Alternatively, for a multi-slot transmission, the BS 101 may configure the UE 102 to transmit on a specific set of slots (e.g., non-SBFD slots) and skip/omit or postpone transmission on the other set of slots (e.g., SBFD slots).

It is noted that, while the resource allocation layout for SBFD operation shown in FIG. 2 has a subband-partition pattern of [D U D], other subband-partition patterns are possible in various embodiments. For example, the subband-partition patterns can be [D U] or [U D].

II. PUCCH Resource Allocation in SBFD

A. PUCCH Resource Allocation and Transmission

1. PUCCH

In PUCCH transmission, a UE can receive dedicated (UE Specific) PUCCH resource configuration, for example, by radio resource control (RRC) signaling. Accordingly, the UE can be provided with one or more PUCCH resources through a higher layer such as the RRC layer.

The UE can determine the appropriate PUCCH resource using one of the following:

- A two-step procedure, where the UE applies a set of rules to select a PUCCH resource set, and then select a PUCCH Resource from the PUCCH Resource Set. For example, this option can be used when the UE transmits hybrid automatic repeat request acknowledgment (HARQ-ACK) feedback to a BS.
- UE directly selects a PUCCH Resource using configuration information. All PUCCH Resources across all sets have a unique ID ranging from 0 to 127. For example, this option can be used when the UE transmits scheduling request (SR) or channel state information (CSI) report. The SR or CSI report configuration can specify one or more PUCCH Resource IDs.

Transmissions on PUCCH can be periodic, semi-persistent, or aperiodic. Each PUCCH resource defines the frequency domain position where the PUCCH begins using the parameter startingPRB. If frequency hoppin$_b$(FH) is enabled, the parameter secondHopPRB is used to specify the frequency domain position of the second hop. For PUCCH Formats, the PUCCH Resource configures the PUCCH duration (nrofSymbols) and the starting symbol (startingSymbolIndex). For PUCCH Formats 2 and 3, the number of allocated RBs is defined using the parameter nrofPRBs.

2. PUCCH Repetition

PUCCH Formats 1, 3, and 4 can be configured for repetition across multiple slots. Each repetition of PUCCH occupies the same resources as the first transmission. When using repetition, there is a choice between disabling FH and enabling intra-slot or inter-slot FH. When using intra-slot FH, startingPRB and secondHopPRB defines the position of each hop in the same way as PUCCH without repetition. The FH pattern is repeated in every slot for PUCCH repetition. When using inter-slot FH, startingPRB defines the position of the PUCCH during even numbered slots, and secondHopPRB defines the position of the PUCCH during odd numbered slots.

3. Observations on PUCCH Frequency Domain Resource Allocation for SBFD

The existing 3GPP specification cannot be directly applied for FDRA in configured grant (CG) PUCCH transmission for SBFD. The frequency domain starting position for PUCCH transmission depends on the number of RBs within the UL BWP. This cannot be directly applied to determine the frequency domain starting position for periodic and semi-persistent PUCCH transmission in SBFD. For periodic and semi-persistent PUCCH, the same resource allocation is used across multiple slots, which can be a combination of full UL and SBFD partitioned slots. The BS (e.g., a gNB) can restrict the resource allocation to coincide with the bandwidth of the UL subband of SBFD partitioned slots. This approach will limit the flexibility of resource allocation. Using the existing 3GPP specification, periodic and semi-persistent PUCCH transmission periodicities may result in transmissions from UL-only slot overlapping with DL subbands in a SBFD partitioned slot, because the allocated frequency resources in an UL-only slot may not be available in a SBFD partitioned slot.

Figures 3, 4:
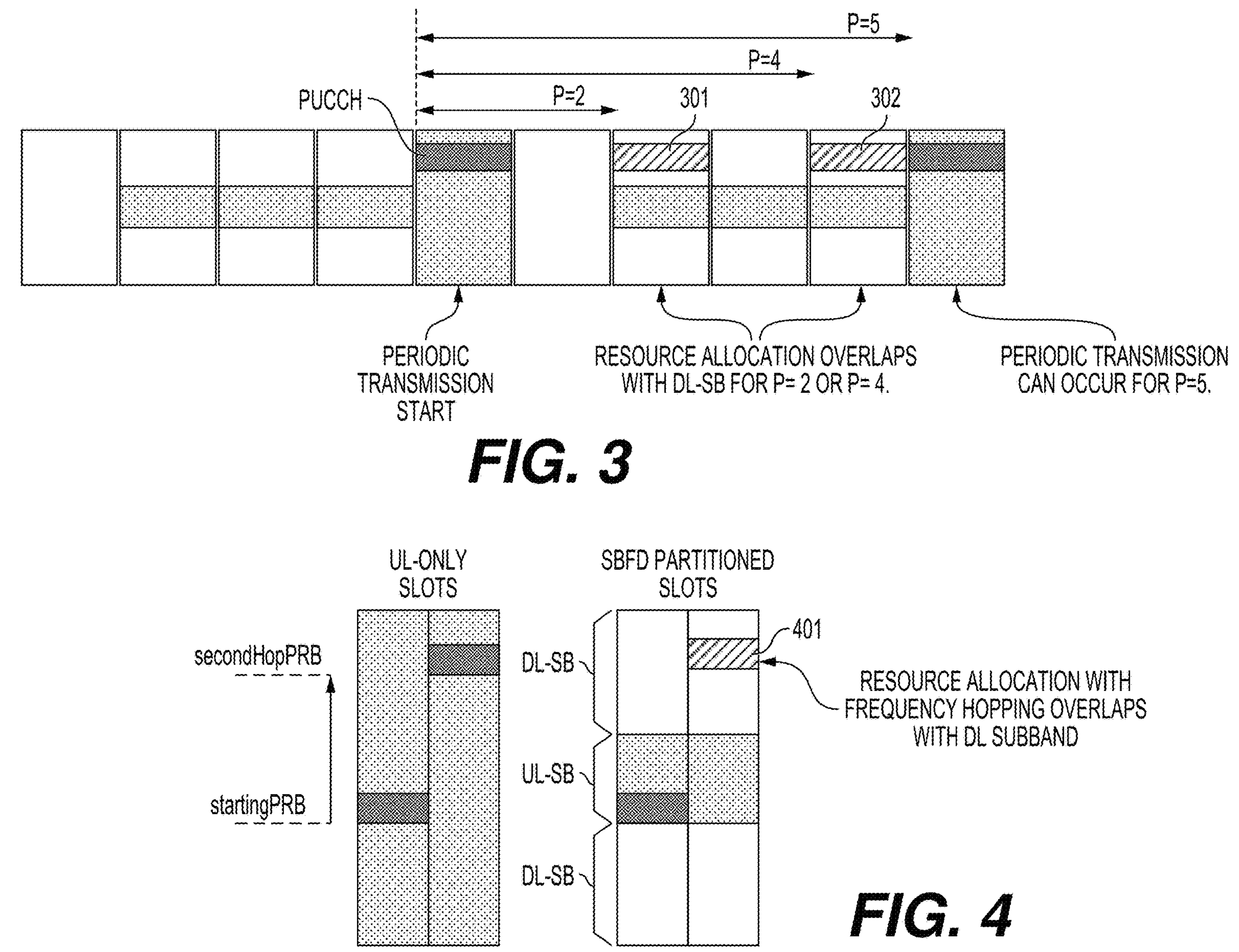
FIG. 3 shows examples where physical uplink control channel (PUCCH) resource allocation may overlap with a downlink (DL) subband (DL-SB).
FIG. 4 shows an example where the PUCCH resource allocation with frequency $hoppin_b$(FH) is contained in a bandwidth part (BWP) of UL-only slots but overlaps with downlink (DL) subband in SBFD partitioned slots.

FIG. 3 shows examples where PUCCH resource allocation may overlap with a DL subband (DL-SB). PUCCH transmissions with a periodicity (P) of 2, 4, and 5 slots are shown. The PUCCH transmissions cross two cycles of the SBFD radio resource allocation layout 200 in FIG. 2. The PUCCH resource allocation overlaps with DL-SB for P=2 or P=4. As shown, configured PUCCH resources 301-302 overlap with the respective DL-SBs. The PUCCH periodic transmission can occur for P=5.

4. Observations on PUCCH Frequency Hopping for SBFD

When FH is applied for PUCCH transmission after the UE receives dedicated UE configuration, the allocated PUCCH resource specifies the startingPRB and secondHopPRB. For aperiodic PUCCH transmissions, a BS has the flexibility to allocate resources in both full UL slots and SBFD partitioned slots. When frequency hopping is enabled for PUCCH transmission, the allocated PUCCH resource specifies the frequency domain position of the first and second hops. For periodic and semi-persistent PUCCH, the same resource allocation is used across multiple slots, which can be a combination of full UL and SBFD partitioned slots.

The resource allocation with frequency hopping may overlap with DL-SB since the frequency domain position of the first and second hops are selected based on the number of RBs within the UL BWP.

FIG. 4 shows an example where the PUCCH resource allocation with FH is contained in a BWP of UL-only slots but overlaps with DL subband in SBFD partitioned slots. As shown, the configured PUCCH resource 401 overlaps with the DL-SB.

5. Observations on PUCCH Repetition for SBFD

For PUCCH repetition, the same resource allocation is repeated across multiple slots. In SBFD systems, PUCCH repetitions can occur across a combination of full UL and SBFD partitioned slots. Since the uplink subband (UL-SB) in SBFD slot has a narrower bandwidth, some resources on full UL slots will overlap with DL-SB on SBFD slots. When frequency hopping is enabled for PUCCH repetitions, the same startingPRB and secondHopPRB are used for each repetition crossing SBFD slots and non-SBFD slots. In SBFD systems, full UL slots and SBFD slots have different bandwidths. When repetitions are across both types of slots, the startingPRB and secondHopPRB for a full UL slot may overlap with the DL-SB of a SBFD slot.

Figure 5:
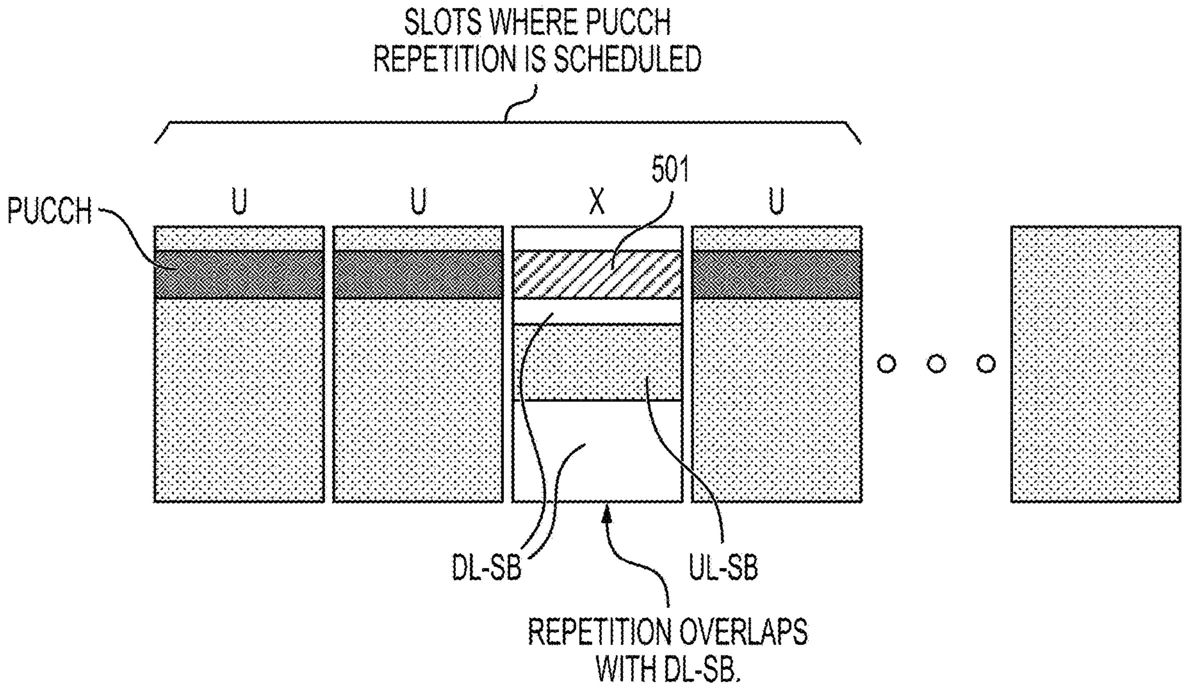
FIG. 5 shows an example of PUCCH repetition.

FIG. 5 shows an example of PUCCH repetition. The PUCCH repetition crosses 4 slots having a UL/DL pattern of [U UX U], where x represents a flexible slot in TDD. The X slot is configured with two DL-SBs and one UL-SB. The PUCCH repetition in the X slot overlaps with the upper DL-SB. As shown, the configured PUCCH resource 501 overlaps with the respective DL-SB.

B. Embodiments of PUCCH Resource Allocation for SBFD

As described above, the existing 3GPP specification exhibits the following problems.

The frequency domain starting position for PUCCH transmission depends on the number of RBs within the UL BWP. This cannot be directly applied to determine the frequency domain starting position in SBFD slots for periodic and semi-persistent PUCCH transmission in SBFD systems.

When frequency hopping is enabled for PUCCH transmission, the configured PUCCH Resource specifies the frequency domain position of the first and second hops. For periodic and semi-persistent PUCCH, the same resource allocation is used across multiple slots, which can be a combination of full UL and SBFD partitioned slots. The resource allocation with frequency hopping may overlap with DL-SB since the frequency domain positions of the first and second hops are selected based on the number of RBs within the UL BWP.

For periodic and semi-persistent PUCCH, the same resource allocation is used across multiple slots, which can be a combination of full UL and SBFD partitioned slots. Periodic and semi-persistent PUCCH transmission periodicities may result in transmissions from UL-only slot overlapping with DL subbands in a SBFD partitioned slot. The allocated frequency resources in the UL-only slot may not be available in SBFD partitioned slot.

To solve the above problems, the following enhancements to PUCCH resource allocation for SBFD can be considered.

Slots for periodic and semi-persistent PUCCH may consist of UL-only slots and SBFD partitioned slots with different bandwidths. Defining a separate frequency domain position for each slot type enables flexibility in resource allocation.

When frequency hopping is applied for PUCCH transmission after the UE receives dedicated UE configuration, the startingPRB and secondHopPRB can be chosen to ensure that the resource allocation always remains within the UL subband of a SBFD partitioned slot.

The two slot types in SBFD have different bandwidths. Periodic and semi-persistent PUCCH transmissions can occur in the same slot type to ensure resource availability for each transmission.

Embodiments 1.1

In some embodiments, for periodic and semi-persistent PUCCH transmission in SBFD, two frequency domain positions are defined based on slot type.

In one embodiment, each frequency domain position is applied to specific sets of slots. In one embodiment, the sets of slots can be configured as part of the SBFD layout configuration. For example, as shown in FIG. 2, the configuration of the SBFD layout 200 can indicate which slots are SBFD slots and which slots are non-SBFD slots. Different frequency domain positions of PUCCH resource allocation can be configured for SBFD slots and non-SBFD slots.

In one embodiment, the two frequency domain positions are provided within each PUCCH Resource. In one embodiment, startingPRB within each PUCCH Resource defines the first frequency domain position. In one embodiment, an additional parameter, startingPRB2, is provided within PUCCH Resource which defines the second frequency domain position. In one embodiment, the sets of slots where each frequency domain position is applied can be indicated to the UE by a high-layer parameter(s), such as parameters carried in an RRC message. In one embodiment, a bitmap can be used to indicate the sets of slots where each frequency domain position is applied.

In one embodiment, separate PUCCH Resources are provided for specific sets of slots within one or each PUCCH Resource Set. In one embodiment, the PUCCH resource can have an attribute that maps its usage to a specific set of slots based on their subband partitioning. In one embodiment, each PUCCH Resource defines the frequency domain position for specific sets of slots. In one embodiment, the sets of slots where each PUCCH Resource is applied can be indicated to the UE by high-layer parameter.

In one embodiment, a bitmap can be used to indicate the sets of slots where each PUCCH Resource is applied. In some embodiments, the bitmaps defined by a high-layer parameter(s) can be used to indicate the sets of slots. Such a scheme is referred to as higher layer bitmap scheme. Examples of the higher layer bitmap scheme are described as follows.

In one embodiment, the bitmap is defined for UL slots configured by high-layer parameter tdd-UL-DL-ConfigurationCommon. In one embodiment, the bitmap is provided per CG PUSCH configuration. In one embodiment, the length of the bitmap is given by the number of UL slots signalled by tdd-UL-DL-ConfigurationCommon (l=nrofUplinkSlots). In one embodiment, the bit value is determined by comparing the set of slots of two base stations: Bit value=0 represents the set of slots indicated as UL in both base stations; and Bit value=1 represents the set of slots indicated as UL in one base station and DL in the other base station.

In one embodiment, the bitmap is defined for UL slots and flexible slots configured by high-layer parameter tdd-UL-DL-ConfigurationCommon. In one embodiment, the length of the bitmap is given by the sum of UL slots and flexible slots configured by tdd-UL-DL-ConfigurationCommon. In one embodiment, the definition of "UL slots" includes the slot that is partially UL. In one embodiment, the definition of "flexible slots" includes the slots that is partially DL and partially flexible.

In one embodiment, the bitmap is defined for UL slots configured by high-layer parameters tdd-UL-DL-ConfigurationCommon and tdd-UL-DL-ConfigurationDedicated. In one embodiment, the length of the bitmap is given by the sum of the UL slots configured by tdd-UL-DL-ConfigurationCommon and tdd-UL-DL-ConfigurationDedicated.

In one embodiment, the bitmap is defined for all UL and flexible slots configured by high-layer parameters tdd-UL-DL-ConfigurationCommon and tdd-UL-DL-Configuration-Dedicated. In one embodiment, the length of the bitmap is given by the sum of UL slots and flexible slots configured by tdd-UL-DL-ConfigurationCommon and tdd-UL-DL-ConfigurationDedicated.

In one embodiment, the bitmap is defined for UL slots when both pattern1 and pattern2 are configured by high-layer parameter tdd-UL-DL-ConfigurationCommon. In one embodiment, the bitmap is provided per CG PUSCH configuration when both pattern and pattern2 configured.

In one embodiment, a separate bitmap is defined for each UL/DL pattern. In one embodiment, a high-layer parameter is defined as the bitmap for pattern1. In one embodiment, the length of the bitmap for pattern1 is given by the number of UL only slots in pattern1. In one embodiment, a high-layer parameter is defined as the bitmap for pattern2. In one embodiment, the length of the bitmap pattern2 is given by the number of UL only slots in pattern2

In one embodiment, the bitmap defined for both UL and flexible slots, as described above, can be adopted for pattern1 and pattern2.

Embodiments 1.2

In some embodiments, when frequency hopping is applied for PUCCH transmission after the UE receives dedicated UE configuration, two second hop frequency domain positions can be determined based on slot type.

In one embodiment, each second hop frequency domain position is applied to specific sets of slots. In one embodiment, the sets of slots can be configured as part of the SBFD layout configuration.

In one embodiment, the two second hop frequency domain positions are provided within one or each PUCCH Resource. In one embodiment, secondHopPRB within each PUCCH Resource defines one second hop frequency domain position. In one embodiment, an additional parameter, secondHopPRB2, is provided within PUCCH Resource which defines the other second hop frequency domain position. In one embodiment, the sets of slots where each second hop frequency domain position is applied can be indicated to the UE by a high-layer parameter(s). In one embodiment, a bitmap can be used to indicate the sets of slots where each second hop frequency domain position is applied.

In one embodiment, separate PUCCH Resources are provided for specific sets of slots within one or each PUCCH Resource Set. In one embodiment, the PUCCH resource can have an attribute that maps its usage to a specific sets of slots based on their subband partitioning. In one embodiment, each PUCCH Resource defines the second hop frequency domain position for specific sets of slots. In one embodiment, the sets of slots where each PUCCH Resource is applied can be indicated to the UE by high-layer parameter.

In one embodiment, a bitmap can be used to indicate the sets of slots where each PUCCH Resource is applied. In one embodiment, the bitmaps defined by high-layer parameter can be used to indicate the sets of slots. For example, the higher layer bitmap scheme can be employed to indicate the sets of slots.

Embodiments 1.3

In some embodiments, when frequency hopping is applied for PUCCH transmission after the UE receives a dedicated UE configuration, skipping/disabling/invalidation of PUCCH frequency hopping can be performed for specific sets of slots.

In one embodiment, PUCCH frequency hopping is skipped/disabled/invalidated for a specific PUCCH transmission occasion (TO) if the configured PUCCH resources overlap (partially or fully) with DL-SB in the TO. For example, in the FIG. 4 example, for the configured PUCCH resource 401 overlapping with the DL subband, the frequency hopping can be skipped.

In one embodiment, the sets of slots where skipping/disabling/invalidation is applied can be indicated to the UE by high-layer parameter(s). In one embodiment, if frequency hopping occurs on a slot indicated for skipping, the UE uses startingPRB2 and secondHopPRB2 for the PUCCH transmission. In one embodiment, a bitmap can be used to indicate the sets of slots where skipping/disabling/invalidation is applied. In one embodiment, the bitmaps defined by high-layer parameter can be used to indicate the sets of slots. For example, the higher layer bitmap scheme can be employed to indicate the sets of slots.

Embodiments 2

In some embodiments, for periodic and semi-persistent PUCCH transmission, skipping/disabling/invalidation of PUCCH resource allocation can be performed for specific sets of slots.

In one embodiment, PUCCH resource allocation is skipped/disabled/invalidated for a specific PUCCH transmission occasion (TO) if the configured PUCCH resources overlap (partially or fully) with DL-SB in the TO. For example, in the FIG. 3 example, for the configured PUCCH resources 301-302 overlapping with the respective DL-SBs, the periodic PUCCH transmissions can be skipped.

In one embodiment, the sets of slots where skipping/disabling/invalidation is applied can be indicated to the UE by high-layer parameter. In one embodiment, a bitmap can be used to indicate the sets of slots where skipping/disabling/invalidation is applied. In one embodiment, the bitmaps defined by high-layer parameter can be used to indicate the sets of slots. For example, the higher layer bitmap scheme can be employed to indicate the sets of slots.

C. PUCCH Repetition for SBFD

As described above, the existing 3GPP specification exhibits the following problems.

PUCCH repetition uses the same resource allocation in multiple consecutive slots, which can be a combination of UL-only slots and SBFD partitioned slots. PUCCH repetition levels may result in transmissions being repeated across different slot types. If the starting slot is UL-only slot, the allocated frequency resources may overlap with a DL subband in SBFD partitioned slots.

When frequency hopping is enabled for PUCCH repetitions, the same startingPRB and secondHopPRB are used for each repetition. In SBFD systems, full UL slots and SBFD slots have different bandwidths. When repetitions are across both types of slots, the startingPRB and secondHop-PRB for a full UL slot may overlap with the DL-SB of a SBFD slot.

To solve the above problems, the following enhancements to PUCCH repetition for SBFD can be considered. Slots for PUCCH repetition may consist of UL-only slots and SBFD partitioned slots with different bandwidths. Defining a separate frequency domain position for each slot type within a repetition enables flexibility in resource allocation. Repetitions can be configured to occur in the same slot type for PUCCH repetition to ensure resource availability for each repetition.

Embodiments 3.1

Two frequency domain positions can be defined for PUCCH repetition based on slot type. In one embodiment, each frequency domain position is applied to specific sets of slots within the PUCCH repetition. In one embodiment, the sets of slots where each frequency domain position is applied are indicated to the UE by high-layer parameter. In one embodiment, the sets of slots where each frequency domain position is applied are indicated to the UE by layer-1 signaling, such as downlink control information (DCI).

In one embodiment, a bitmap can be used to indicate the sets of slots where each frequency domain position is applied. For example, for sets of slots with bit value=0, UE applies one frequency domain position. For sets of slots with bit value=1, UE applies the other frequency domain position.

In one embodiment, the bitmaps defined by high-layer parameter can be used to indicate the sets of slots. For example, the higher layer bitmap scheme can be employed to indicate the sets of slots.

In one embodiment, the bitmaps defined by layer-1 signaling can be used to indicate the sets of slots. Such a scheme can be referred to as a layer-1 bitmap scheme. Examples of the layer-1 bitmap scheme are described as follows.

In one embodiment, the bitmap is defined for flexible slots that are dynamically reconfigured by Layer 1 signalling using SlotFormatIndicator parameter structure. In one embodiment, the bitmap is provided per Slot Format Combination. In one embodiment, the bitmap has two parts. The first part of the bitmap is defined based on slots that are dynamically reconfigured by Layer 1 signalling. The second part of the bitmap is defined based on CG PUSCH configuration by higher layer parameters. In one embodiment, the length of first part of the bitmap is equal the number of Slot Formats within each Slot Format Combination.

Embodiments 3.2

In some embodiments, when frequency hopping is enabled for PUCCH repetition, two second hop frequency domain positions can be defined based on slot type. In one embodiment, each second hop frequency domain position is applied to specific sets of slots within the PUCCH repetition. In one embodiment, the sets of slots where each second hop frequency domain position is applied are indicated to the UE by high-layer parameter. In one embodiment, the sets of slots where each second hop frequency domain position is applied are indicated to the UE by layer-1 signaling.

In one embodiment, a bitmap can be used to indicate the sets of slots where each second hop frequency domain position is applied. For example, for sets of slots with bit value=0 represents full UL slots, UE applies one second hop frequency domain position. For sets of slots with bit value=1 represents SBFD slots, UE applies the other second hop frequency domain position.

In one embodiment, the bitmaps defined by high-layer parameter can be used to indicate the sets of slots. For example, the higher layer bitmap scheme can be employed to indicate the sets of slots. In one embodiment, the bitmaps defined by layer-1 signaling can be used to indicate the sets of slots. For example, the layer-1 bitmap scheme can be employed to indicate the sets of slots.

Embodiments 3.3

In some embodiments, for PUCCH repetition, skipping of repetitions for specific sets of slots can be performed. For example, in the FIG. 5 example, repetition on the configured PUCCH resource 501 that overlaps with the respective DL-SB can be skipped.

In one embodiment, skipping is applied if PUCCH repetition overlaps (partially or fully) with the DL-SB in the SBFD slots. In one embodiment, the sets of slots where skipping is applied are indicated to the UE by high-layer parameter. In one embodiment, if PUCCH repetition occurs on a slot indicated for skipping, the UE postpones the repetition. In one embodiment, if PUCCH repetition occurs on a slot indicated for skipping, the UE drops the repetition.

In one embodiment, the sets of slots where skipping is applied are indicated to the UE by layer-1 signalling. In one embodiment, a bitmap can be used to indicate the sets of slots where skipping is applied, In one embodiment, the bitmaps defined by high-layer parameter can be used to indicate the sets of slots. For example, the higher layer bitmap scheme can be employed to indicate the sets of slots.

In one embodiment, the bitmaps defined by layer-1 signaling can be used to indicate the sets of slots. For example, the layer-1 bitmap scheme can be employed to indicate the sets of slots.

Embodiments 3.4

In some embodiments, the PUCCH configuration can specify for each PUCCH resource a replacement PUCCH resource that the repetition switches to in specific sets of slots. The replacement PUCCH resource can be configured as a PUCCH resource field holding the ID of another PUCCH resource. The replacement PUCCH resource can be selected based on matching indices between PUCCH resource pairs. In one embodiment, the sets of slots where replacement PUCCH resource is supposed to be used are indicated to the UE by high-layer parameter. In one embodiment, if a replacement PUCCH resource is not configured then PUCCH repetition is skipped (dropped or postponed).

D. Process of PUCCH Transmission in SBFD

Figure 6:
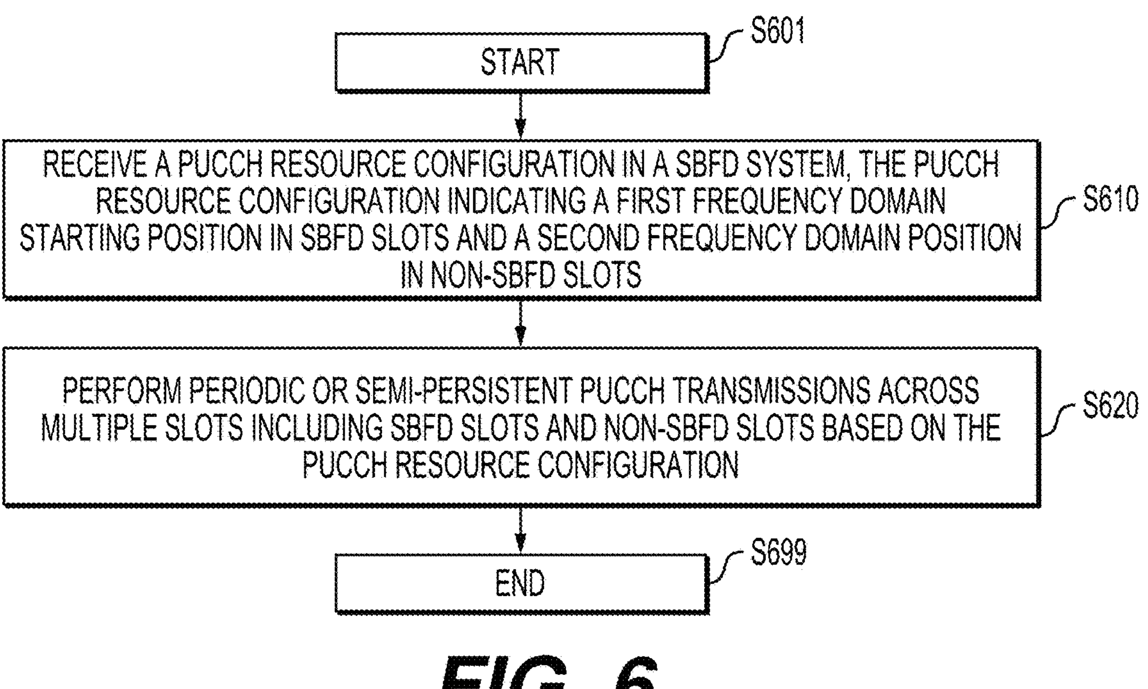
FIG. 6 shows an example of PUCCH transmission process 600 in a SBFD system according to an embodiment of the disclosure.

FIG. 6 shows an example of PUCCH transmission process 600 in a SBFD system according to an embodiment of the disclosure. The process 600 can be performed by a UE. The process can start from S601 and proceed to S610.

At S610, a PUCCH resource configuration can be received from a BS in the SBFD system. The PUCCH resource configuration can indicate a first frequency domain starting position for PUCCH transmission in SBFD slots and a second frequency domain position for PUCCH transmission in non-SBFD slots. For example, the UE can receive one or more RRC messages from the BS. The one or more RRC messages can indicate the PUCCH resource configuration. The one or more RRC messages may indicated one or more PUCCH resources each associated with an index (or ID). The one or more RRC messages may indicate one or more PUCCH resource sets. Each PUCCH resource set can indicate one or more PUCCH resources, for example, by referring to the indices of the respective PUCCH resources.

In an embodiment, the PUCCH resource configuration indicates one or more PUCCH resources, and the first frequency domain starting position and the second frequency domain starting position are provided in one of the one or more PUCCH resources. In an embodiment, the PUCCH resource configuration indicates a PUCCH resource set including separate PUCCH resources corresponding to SBFD slots and non-SBFD slots, respectively, and the first frequency domain starting position and the second frequency domain starting position are provided in the separate PUCCH resources included in the PUCCH resource set.

At S620, periodic or semi-persistent PUCCH transmissions can be performed across multiple slots including SBFD slots and non-SBFD slots based on the PUCCH resource configuration received from the base station. The periodic or semi-persistent PUCCH transmissions across the SBFD slots uses the first frequency domain starting position. The periodic or semi-persistent PUCCH transmissions across the non-SBFD slots uses the second frequency domain starting position. For example, the periodic or semi-persistent PUCCH transmissions are used for HARQ-ACK feedback, SR, or CSI report. The process 600 proceeds to S699 and terminates at S699.

III. SRS Resource Allocation in SBFD

A. SRS Resource Allocation and Transmission

1. SRS Configuration

SRS can be used for UL CSI acquisition, DL CSI acquisition when DL-UL reciprocity exist (TDD), and UL beam management. SRS occupies $$N_{Symb}^{SRS}$$

consecutive symbols in a slot. For example, $$N_{Symb}^{SRS}$$

$\in\{1,2,4\}$ in 3GPP Standard Release 15, and $$N_{Symb}^{SRS} \in$$

{1,2,4,8,10,12,14} in 3GPP Standard Release 17. An SRS transmission can occupy up to 272 RBs (all UL PRBs in a BWP). An individual UE uses a transmission comb to select a specific set of subcarriers to transmit on. For example, transmission comb sizes of 2, 4 and 8 are supported. For example, transmission comb sizes of 2 means that the UE transmits on every second subcarrier. Two groups of UEs can therefore be frequency multiplexed.

The SRS can be configured using one or more SRS Resource Sets. Each SRS Resource Set contains one or more SRS resources. In an example, up to 16 SRS resources can be linked to an SRS Resource Set.

The time domain behaviour of SRS configuration is triggered by the resourceType information element (IE). SRS transmission can be configured as aperiodic, semi-persistent or periodic. For aperiodic transmissions, the slotOffset IE determines the number of slots between the triggering DCI and the actual SRS transmission. For semi-persistent and periodic SRS, the periodicityAndOffset IE determines the periodicity and slot offset for SRS transmission. The nrofSymbols IE determines the number of symbols withing a slot used for SRS transmission.

The SRS sequence can be mapped to resource elements in a slot for each antenna ports $p_i$ as $$a_{K_{TC}k'+k_0^{(p_i)},l'+l_0}^{(p_i)} = \begin{cases} \frac{1}{\sqrt{N_{ap}}}\beta_{SRS}r^{(p_i)}(k',l') & k'=0,\ \ldots\ ,M_{sc,b}^{RS}-1\ \ l'=0,\ \ldots\ ,N_{symb}^{SRS}-1 \\ 0 & \text{otherwise} \end{cases}$$

where $$M_{sc,b}^{SRS} = m_{SRS,b}N_{sc}^{RB}/(K_{TC}P_F)$$

$\beta_{SRS}$ denotes Amplitude Scaling Factor $m_{SRS,b}$ is given by a row in Table 6.4.1.4.3-1 in TS 38.211

$P_F$ denotes Frequency Scaling Factor, which is related to "partial frequency sounding"

$K_{TC}$ denotes Transmission Comb Factor

The frequency domain position of SRS is configured by c-SRS, b-SRS and b-hop within the freqHopping parameter structure. c-SRS and b-SRS are used to select a row and column in Table 6.4.1.4.3-1 in TS 38.211. Each combination of c-SRS and b-SRS corresponds to a combination of $m_{SRS,b}$ and $N_b$. $m_{SRS,b}$ represents the number of allocated RBs. $N_b$ is used to determine the frequency domain position of the allocated RB. Multiples of 4 RBs can be allocated for each SRS transmission. As an example, FIG. 7 shows a portion of Table 6.4.1.4.3-1 in TS 38.211.

Figures 8, 9:
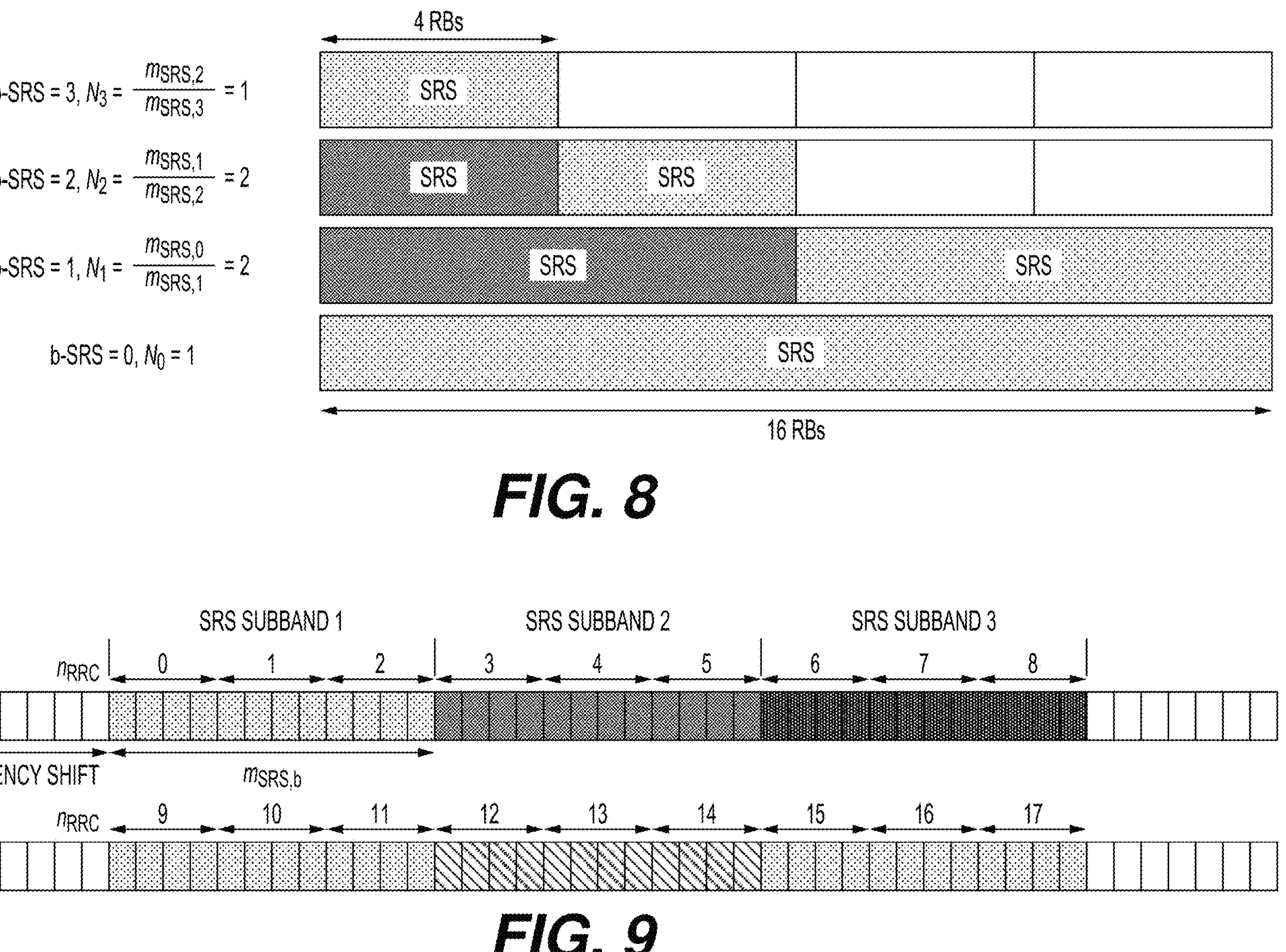
FIG. 8 shows an example of determining sounding reference signal (SRS) frequency domain position based on Table 6.4.1.4.3-1 in TS 38.211.
FIG. 9 shows an example of determining SRS FH positions.

FIG. 8 shows an example of determining SRS frequency domain position based on Table 6.4.1.4.3-1 in TS 38.211. For c-SRS=4, the largest allocation is 16 RBs (b-SRS=0). The UE can be allocated smaller number of RBs. For example, the UE can be allocated 8 RBs for b-SRS=1, and 4 RBs for b-SRS=2 and b-SRS=3. When a smaller number of RBs are allocated, frequency hopping may be required to cover the whole BWP. SRS across smaller number of RBs increases multiplexing capacity.

The frequency-domain starting position ko is defined by $$k_0^{(p_i)} = \bar{k}_0^{(p_i)} + n_{offset}^{FH} + n_{offset}^{RPFS}$$

$$\bar{k}_0^{(p_i)} = n_{shift}N_{sc}^{RB} + \left(k_{TC}^{(p_i)} + k_{offset}^{l'}\right) \bmod K_{TC}$$

-continued $$k_{TC}^{(p_i)} = \begin{cases} (\bar{k}_{TC} + K_{TC}/2) \bmod K_{TC} & \text{if } N_{ap}^{SRS} = 4,\ p_i \in \{1001, 1003\}, \text{ and } n_{SRS}^{cs,max} = 6 \\ (\bar{k}_{TC} + K_{TC}/2) \bmod k_{TC} & \text{if } N_{ap}^{SRS} = 4,\ p_i \in \{1001, 1003\}, \text{ and } n_{SRS}^{cs} \in \{n_{SRS}^{cs,max}/2, \ldots, n_{SRS}^{cs,max} - 1\} \\ \bar{k}_{TC} & \text{otherwise} \end{cases}$$

$$n_{offset}^{FH} = \sum_{b=0}^{B_{SRS}} m_{SRS,b} N_{sc}^{RB} n_b$$

$$n_{offset}^{RPFS} = N_{sc}^{RB} m_{SRS,B_{SRS}} ((k_F + k_{hop}) \bmod P_F)/p_F$$

Where the frequency domain shift value $n_{shift}$ adjusts the SRS allocation to align with the common resource block (CRB) grid in multiples of four (freqDomainShift in the SRS-Resource IE)

$$\bar{k}_{TC} \in \{0, 1, \ldots, K_{TC} - 1\}$$

is the transmission comb offset (transmissionComb in the SRS-Resource IE)

$n_b$ is a frequency position index $$n_{offset}^{RPFS}$$

enables SKS transmission on partial frequency resources within the legacy SRS frequency resources Frequency hopping for SRS is configured by the parameter b-hop. If b-hop is greater than or equal to b-SRS, frequency hopping is disabled. In this case, $$n_b = \lfloor 4 n_{RRC} / m_{SRS,b} \rfloor \bmod N_b$$

remains constant for all symbols of the SRS. If b-hop is less than b-SRS, frequency hopping is enabled. In this case, $$n_b = \begin{cases} \lfloor 4 n_{RRC} / m_{SRS,b} \rfloor \bmod N_b & b \le b_{hop} \\ (F_b(n_{SRS}) + \lfloor 4 n_{RRC} / m_{SRS,b} \rfloor) \bmod n_b & \text{otherwise} \end{cases}$$

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ is odd} \end{cases}$$

The frequency hopping pattern depends on $n_{SRS}$. For aperiodic, $$n_{SRS} = \left\lfloor \frac{l'}{R} \right\rfloor,$$

where intra-slot FH is supported.

For periodic or semi-persistent, $$n_{SRS} = \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor$$

where intra-slot and inter-slot FH are supported.

In the above formulas, $n_{RRC}$ determines the FH position and is given by the field frequencyDomainPosition, $n_{SRS}$ counts the number of SRS transmissions, l' is the symbol number, and R is the repetition factor given by the field repetitionFactor.

FIG. 9 shows an example of determining SRS FH positions. In the example, c-SRS=10, and b-SRS=1. Accordingly, based on Table 6.4.1.4.3-1 in TS 38.211 in FIG. 7, $m_{SRS,1}$=12, $N_1$=3. Three SRS SBs are shown on two symbols. When FH is disabled, ng is constant. SRS transmission is on the same SB on all symbols:

$$n_b = 0 \text{ for } n_{RRC} = (0,1,2,9,10,11 \ldots)$$

$$n_b = 1 \text{ for } n_{RRC} = (3,4,5,12,13,14 \ldots)$$

$$n_b = 2 \text{ for } n_{RRC} = (6,7,8,15,16,17 \ldots)$$

When FH is enabled, SRS transmission occurs on different SBs for different symbols.

2. Observations on SRS Frequency Domain Resource Allocation for SBFD

The existing 3GPP specification can be used to determine the frequency domain starting position for aperiodic SRS transmission in SBFD. For example, BS has the flexibility to dynamically indicate the freqDomainShift and frequencyDomainPosition in both UL-only slots and SBFD partitioned slots.

Potential issue with frequency domain starting position at UL/DL subband edge may arise. Specifically, SRS frequency domain resources are allocated in multiples of 4 RBs with respect to CRB numbering. The UL subband may not be selected to align with CRB numbering. Therefore, SRS resources may overlap with the DL subband near UL/DL subband edge in a SBFD partitioned slot.

Figure 10:
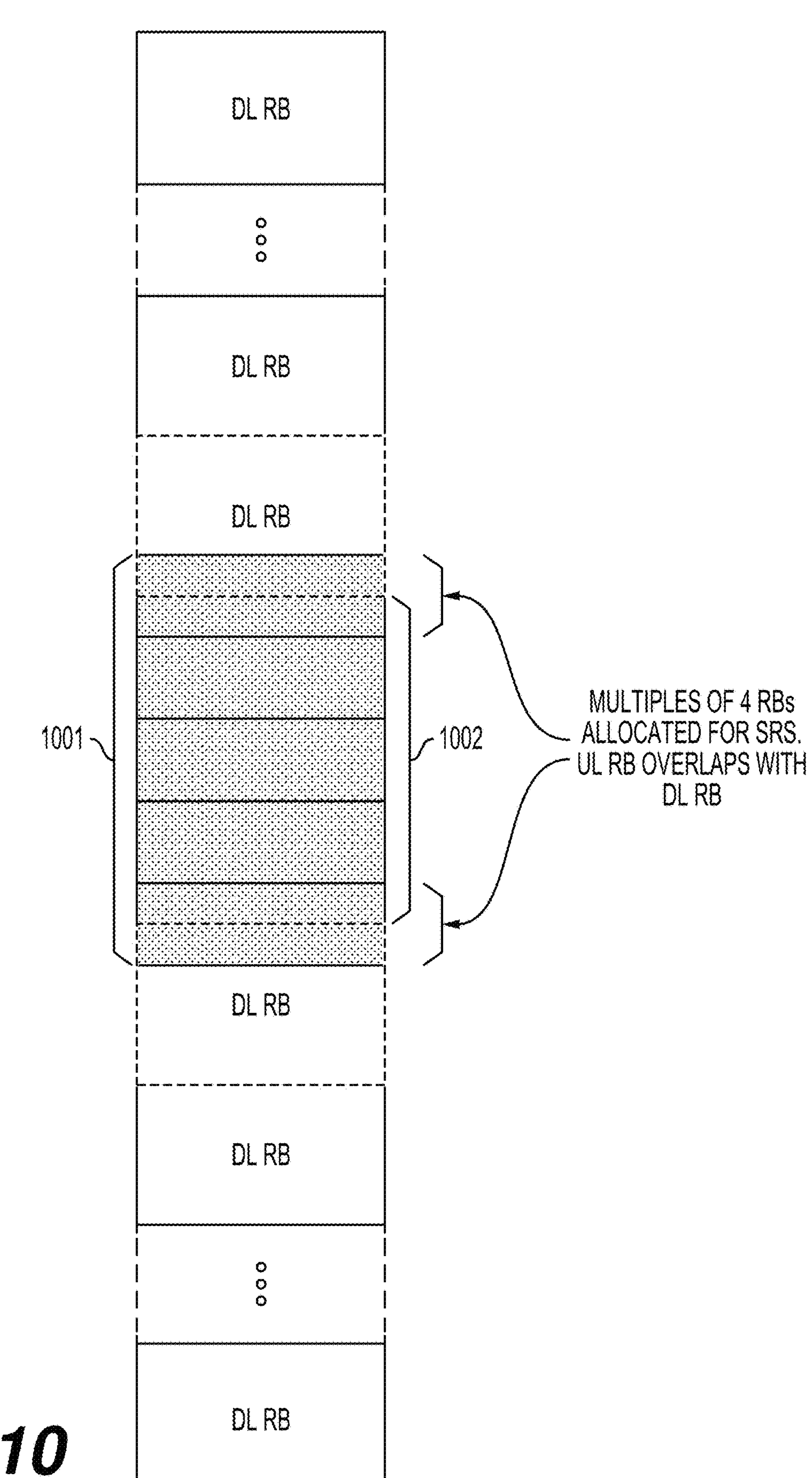
FIG. 10 shows an example where SRS resources overlap with the DL subband near UL/DL subband edge in a SBFD partitioned slot.

FIG. 10 shows an example where SRS resources overlap with the DL subband near UL/DL subband edge in a SBFD partitioned slot. For example, the SRS resources 1001 are multiples of 4 RBs with respect to CRB numbering. However, the UL subband 1002 is configured in a way that the lower edge of the UL subband 1002 is not aligned with an RB having a CRB index that is a multiple of 4, and the upper edge of the UL subband 1002 is not aligned with an RB having a CRB index that is a multiple of 4 minus 1.

The existing 3GPP specification cannot be directly applied to determine the frequency domain starting position for periodic and semi-persistent SRS transmission in SBFD. Specifically, for periodic and semi-persistent SRS transmission, the same resource allocation is used across multiple slots, which can be a combination of full UL and SBFD partitioned slots. Periodic and semi-persistent SRS transmission periodicities may result in transmissions from UL-only slot overlapping with DL subbands in a SBFD partitioned slot. The allocated frequency resources in the UL-only slot may not be available in SBFD partitioned slot.

The existing 3GPP specification cannot be directly applied for frequency hopping in SRS transmission for SBFD. Specifically, in SBFD partitioned slots/symbols, the resource allocation with frequency hopping is likely to overlap with DL subband since the frequency position index for each hop is confined within the BWP of the UL-only slot.

B. RB Allocation at UL/DL subband edge for SRS in SBFD

As described above, potential overlapping of UL and DL RBs near UL/DL subband edge for frequency domain position of SRS in SBFD partitioned slot may take place, as shown in the FIG. 10 example.

Embodiment 4.1

One possible solution to the above problem is that, when allocating frequency domain resources for SRS transmission, the RBs that are not confined within the UL subband are not transmitted.

Embodiment 4.2

An alternative solution can be that, for the configured set of PRBs that can be allocated in an UL subband, the CRB index of the first PRB and the CRB index following the last PRB can be configured to be both divisible by four, i.e., CRB index modulo 4=0.

C. SRS Resource Allocation for SBFD

As described above, the existing 3GPP specification may incur the following problems for SRS resource allocation for SBFD. First, the frequency domain position for SRS transmission depends on the number of RBs within the UL BWP. This cannot be directly applied to determine the frequency domain starting position in SBFD slots for periodic and semi-persistent PUCCH transmission in SBFD systems.

Second, for periodic and semi-persistent SRS, the same resource allocation is used across multiple slots, which can be a combination of full UL and SBFD partitioned slots. Periodic and semi-persistent SRS transmission periodicities may result in transmissions from UL-only slot overlapping with DL subbands in a SBFD partitioned slot. The allocated frequency resources in the UL-only slot may not be available in SBFD partitioned slot.

Third, for frequency hopping in SRS transmission, the frequency domain position of each hop is calculated such that the resource allocation is within the UL BWP. In SBFD partitioned slots, the resource allocation with frequency hopping is likely to overlap with DL subband since the frequency position index for each hop is confined within the BWP of the UL-only slot.

To solve the above problems, the following enhancement can be considered. First, slots for periodic and semi-persistent SRS may consist of UL-only slots and SBFD partitioned slots-with different bandwidths. A separate frequency domain position can be defined for each slot type enables flexibility in resource allocation.

Second, the two slot types in SBFD have different bandwidths. Periodic and semi-persistent SRS transmissions can be configured to occur in the same slot type to ensure resource availability for each transmission.

Third, when frequency hopping is enabled for SRS transmission, the frequency domain position of each hop can be chosen to ensure that the resource allocation always remains within the UL subband of a SBFD partitioned slot. For the case with separate frequency domain position for each slot type, the frequency hopping procedure can consider the frequency domain position for each slot type to ensure resource availability.

Embodiments 5.1

In some embodiments, for periodic and semi-persistent SRS transmission in SBFD, two sets of parameters can be defined to configure the frequency domain starting position of SRS transmission based on slot type. In one embodiment, each set of parameters is used to configure the frequency domain starting position for specific sets of slots.

In some embodiments, the two sets of parameters are provided within one or each SRS Resource. In one embodiment, two values of frequency domain position are provided within each SRS Resource. For example, freqDomainPosition within SRS Resource defines the first frequency domain position. An additional parameter, freqDomainPosition2, is provided within SRS Resource which defines the second frequency domain position.

In one embodiment, two values of frequency domain shift are provided within one or each SRS Resource. In one embodiment, freqDomainShift within SRS Resource defines the first frequency domain shift value. In one embodiment, an additional parameter, freqDomainShift2, is provided within SRS Resource which defines the second frequency domain shift value.

In some embodiments, two sets of the parameter freqHopping are provided within one or each SRS Resource. In one embodiment, freqHopping within each SRS Resource defines the first frequency domain configuration. In one embodiment, c-SRS, b-SRS and b-hop within freqHopping are used to configure the first frequency domain position. In one embodiment, an additional parameter, freqHopping2 is provided within SRS Resource which defines the second frequency domain configuration. In one embodiment, c-SRS2, b-SRS2 and b-hop2 within freqHopping2 are used to configure the second frequency domain position.

In one embodiment, the sets of slots where each set of parameters is applied can be indicated to the UE by high-layer parameter. In one embodiment, a bitmap can be used to indicate the sets of slots where each set of parameters is applied. In one embodiment, the bitmaps defined by high-layer parameter can be used to indicate the sets of slots. For example, the higher layer bitmap scheme can be employed to indicate the sets of slots.

In some embodiments, separate SRS Resources are provided for specific sets of slots within one or each SRS Resource Set. In one embodiment, each SRS Resource can be used to configure the frequency domain starting position for specific sets of slots. In one embodiment, the sets of slots where each SRS Resource is applied can be indicated to the UE by high-layer parameter. In one embodiment, a bitmap can be used to indicate the sets of slots where each SRS Resource is applied. In one embodiment, the bitmaps defined by high-layer parameter can be used to indicate the sets of slots. For example, the higher layer bitmap scheme can be employed to indicate the sets of slots.

Embodiments 5.2

In some embodiments, the frequency domain resource configuration for SRS is modified to ensure that the frequency domain position, with and without frequency hopping, is confined within the UL-SB in the SBFD slots/symbols.

In some embodiments, for periodic and semi-persistent SRS transmission in SBFD, the frequency domain starting position for specific sets of slots is defined as $$k_0^{(p_i)}(j) = \bar{k}_0^{(p_i)}(j) + n_{offset}^{FH}(j) + n_{offset}^{RPFS}(j)$$

$$\bar{k}_0^{(p_i)}(j) = n_{shift}(j)N_{sc}^{RB} + \left(k_{TC}^{(p_i)} + k_{offset}^{l'}\right)\bmod K_{TC} + RB_{first}(j)$$

$$n_{offset}^{FH}(j) = \sum_{b=0}^{B_{SRS}} m_{SRS,b}(j)N_{sc}^{RB}n_b(j)$$

$$n_{offset}^{RPFS}(j) = N_{sc}^{RB}m_{SRS,b}(j)((k_F + k_{hop})\bmod P_F)/P_F$$

When frequency hopping is disabled for SRS transmission, the frequency position index for each set of slots, $n_b(j)$, is given by $$n_b(j) = \lfloor 4n_{RRC}(j)/m_{SRS,b}(j)\rfloor \bmod N_b(j)$$

When frequency hopping is enabled for SRS transmission, the frequency position indices for each set of slots, $n_b(j)$, is given by $$n_b(j) = \begin{cases} \lfloor 4n_{RRC}(j)/m_{SRS,b}(j)\rfloor \bmod N_b(j) & b(j) \le b_{hop}(j) \\ \lfloor F_b(n_{SRS}) + 4n_{RRC}(j)/m_{SRS,b}(j)\rfloor \bmod N_b(j) & \text{otherwise} \end{cases}$$

For the above formulas of Embodiments 5.2, $RB_{first}(j)$ is the first UL RB for the set of slots with index j, $n_{shift}(j)$ is the frequency domain shift value for the set of slots with index j, $m_{SRS,b}$ (j) is the number of allocated RBs for the set of slots with index j, $n_{RRC}(j)$ is given by the higher-layer parameter freqDomainPosition for the set of slots with index j, $m_{SRS,b}$ (j) and $N_b(j)$ for b (j)=$B_{SRS}(j)$ are given by the selected rows of the SRS Bandwidth Configuration table (in FIG. 7) corresponding to the value of $C_{SRS}(j)$ for the set of slots with in with index j, $j \in \{0,1\}$.

Further, for the above formulas of Embodiments 5.2, $k_F \in \{0,1, \ldots . P_F-1\}$ is given by the higher-layer parameter StartRBIndex if configured. Otherwise, $k_F=0$. $k_{hop}$ is given by Table 6.4.1.4.3-3 in TS 138 211 with $$\bar{k}_{hop} = \left\lfloor \frac{n_{SRS}}{\prod_{b'=b_{hop}}^{B_{SRS}} N_{b'}} \right\rfloor \bmod P_F$$

$$N_{b_{hop}} = 1$$

If the SRS is configured by IE SRS-PosResource, $$k_{offset}^{l'}$$

is given by Table 6.4.1.4.3-2 in TS 138 211, otherwise $$k_{offset}^{l'} = 0.$$

The parameter $$k_{TC}^{(p_i)}$$

is given by $$k_{TC}^{(p_i)} = \begin{cases} \left(\bar{k}_{TC} + K_{TC}/2\right)\bmod K_{TC} & \text{if } N_{ap}^{SRS} = 4,\ p_i \in \{1001, 1003\}, \text{ and } n_{SRS}^{cs,max} = 6 \\ \left(\bar{k}_{TC} + K_{TC}/2\right)\bmod K_{TC} & \text{if } N_{ap}^{SRS} = 4,\ p_i \in \{1001, 1003\}, \text{ and } n_{SRS}^{cs} \in \left\{n_{SRS}^{cs,max}/2, \ldots, n_{SRS}^{cs,max} - 1\right\} \\ \bar{k}_{TC} & \text{otherwise} \end{cases}$$

The parameter F_b (n_SRS) is given by $$F_b(n_{SRS}) = \begin{cases} (N_b/2)\left\lfloor \frac{n_{SRS}\bmod \Pi_{b'=b_{hop}}^{b} N_{b'}}{\Pi_{b'=b_{hop}}^{b-1} N_{b'}} \right\rfloor + \left\lfloor \frac{n_{SRS}\bmod \Pi_{b'=b_{hop}}^{b} N_{b'}}{2\Pi_{b'=b_{hop}}^{b-1} N_{b'}} \right\rfloor & \text{if } N_b \text{ even} \\ \lfloor N_b/2 \rfloor \left\lfloor n_{SRS}/\Pi_{b'=b_{hop}}^{b-1} N_{b'} \right\rfloor & \text{if } N_b \text{ odd} \end{cases}$$

where for aperiodic SRS transmission, $$n_{SRS} = \left\lfloor \frac{l'}{R} \right\rfloor$$

For periodic or semi-persistent SRS transmission $$n_{SRS} = \left(\frac{N_{slot}^{frame,\mu} n_f + n_{s,f}^{\mu} - T_{offset}}{T_{SRS}}\right) \cdot \left(\frac{N_{symb}^{SRS}}{R}\right) + \left\lfloor \frac{l'}{R} \right\rfloor$$

In one embodiment, the sets of slots where each frequency domain starting position is applied are indicated to the UE by high-layer parameter. In one embodiment, the sets of slots where each frequency domain starting position is applied are indicated to the UE by layer-1 signaling. In one embodiment, a bitmap can be used to indicate the sets of slots. In one embodiment, the bitmaps defined by high-layer parameter can be used to indicate the sets of slots. For example, the higher layer bitmap scheme can be employed to indicate the sets of slots.

In one embodiment, $C_{SRS}(j)$ is selected for specific sets of slots such that $m_{SRS,0}(j)$ (for $B_{SRS}(j)=0$) is an integer multiple of 4 between 4 and $$N_{RB}^{size}(j), \text{ where } N_{RB}^{size}(j)$$

is the maximum number of RBs for the set of slots with index j. In one embodiment, the bit value serves as a pointer to a table that defines the values of $$N_{RB}^{size}(j)$$

and $RB_{first}(j)$.

Embodiments 6

In some embodiments, for periodic and semi-persistent SRS transmission in SBFD, skipping/disabling/invalidation of SRS resource allocation for specific sets of slots can be supported. In one embodiment, SRS resource allocation is skipped/disabled/invalidated for a specific SRS transmission occasion (TO) if the configured SRS resources overlap (partially or fully) with DL-SB in the TO. In one embodiment, the sets of slots where skipping/disabling/invalidation is applied can be indicated to the UE by high-layer parameter. In one embodiment, a bitmap can be used to indicate the sets of slots where skipping/disabling/invalidation is applied. In one embodiment, the bitmaps defined by high-layer parameter can be used to indicate the sets of slots. For example, the higher layer bitmap scheme can be employed to indicate the sets of slots.

D. Process of SRS Transmission in SBFD

Figures 11, 12:
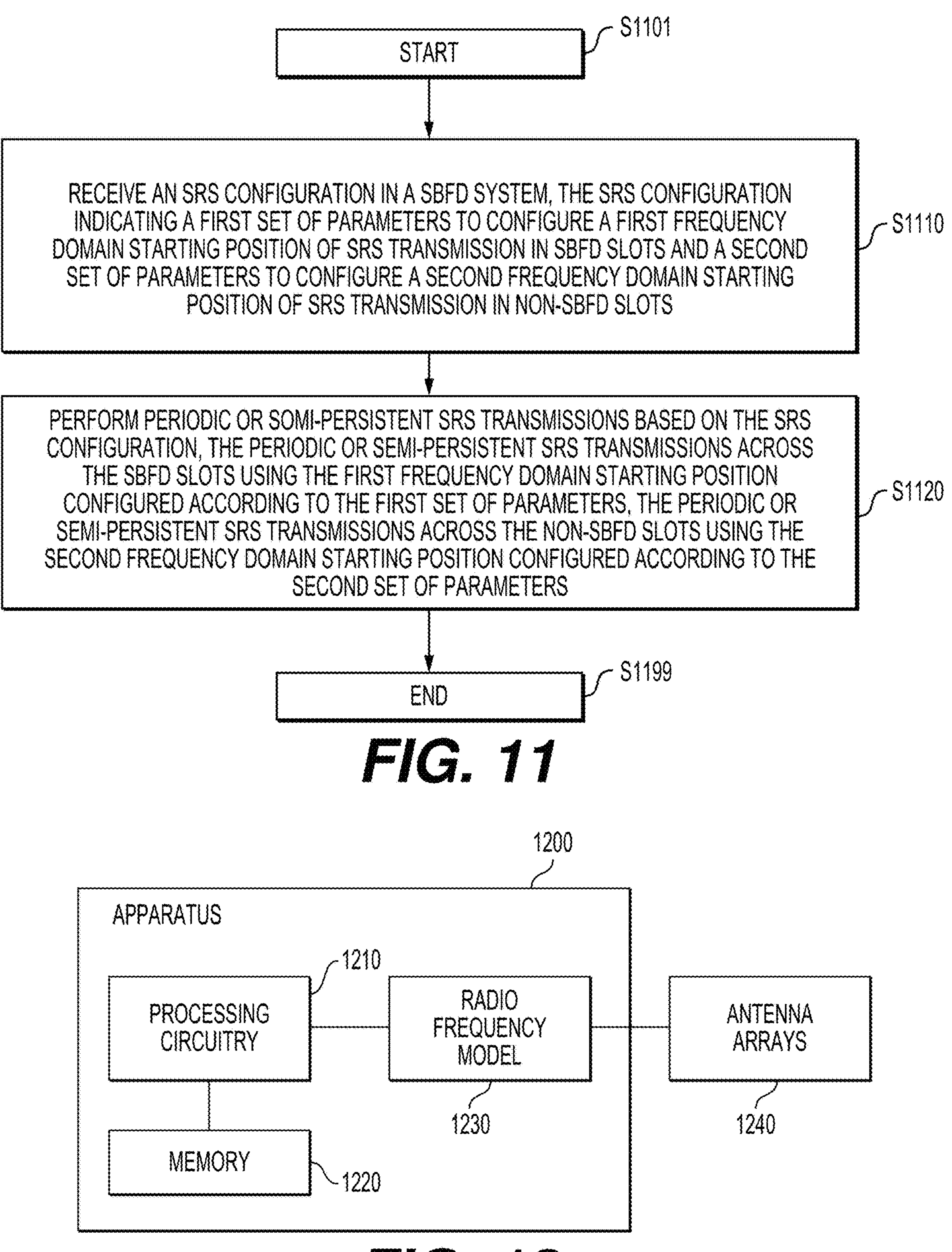
FIG. 11 shows an example of SRS transmission process 1100 in a SBFD system according to an embodiment of the disclosure.
FIG. 12 shows an apparatus 1200 according to embodiments of the disclosure.

FIG. 11 shows an example of SRS transmission process 1100 in a SBFD system according to an embodiment of the disclosure. The process 1100 can be performed by a UE. The process can start from S1101 and proceed to S1110.

At S1110, an SRS configuration can be received from a base station in a SBFD system. The SRS configuration indicates a first set of parameters to configure a first frequency domain starting position of SRS transmission in SBFD slots and a second set of parameters to configure a second frequency domain starting position of SRS transmission in non-SBFD slots.

In an embodiment, the SRS configuration indicates an SRS resource. The first set of parameters and the second set of parameters are provided in the SRS resource. In an embodiment, the SRS configuration indicates an SRS resource set including separate SRS resources corresponding to SBFD slots and non-SBFD slots, respectively. The first set of parameters and the second set of parameters are provided in the separate SRS resources included in the SRS resource set.

At S1120, periodic or semi-persistent SRS transmissions across multiple slots including SBFD slots and non-SBFD slots can be performed based on the SRS configuration received from the base station. The periodic or semi-persistent SRS transmissions across the SBFD slots uses the first frequency domain starting position configured according to the first set of parameters. The periodic or semi-persistent SRS transmissions across the non-SBFD slots uses the second frequency domain starting position configured according to the second set of parameters. The process 1100 proceeds to S1199 and terminates at S1199.

FIG. 12 shows an apparatus 1200 according to embodiments of the disclosure. The apparatus 1200 can be configured to perform various functions in accordance with one or more embodiments or examples described herein. Thus, the apparatus 1200 can provide means for implementation of mechanisms, techniques, processes, methods, functions, components, systems described herein. For example, the apparatus 1200 can be used to implement functions of UEs or BSs in various embodiments and examples described herein. The apparatus 1200 can include a general-purpose processor or specially designed circuits to implement various functions, components, or processes described herein in various embodiments. The apparatus 1200 can include processing circuitry 1210, a memory 1220, and a radio frequency (RF) module 1230.

In various examples, the processing circuitry 1210 can include circuitry configured to perform the functions and processes described herein in combination with software or without software. In various examples, the processing circuitry 1210 can be a digital signal processor (DSP), an application-specific integrated circuit (ASIC), programmable logic devices (PLDs), field programmable gate arrays (FPGAs), digitally enhanced circuits, or comparable device or a combination thereof.

In some other examples, the processing circuitry 1210 can be a central processing unit (CPU) configured to execute program instructions to perform various functions and processes described herein. Accordingly, the memory 1220 can be configured to store program instructions. The processing circuitry 1210, when executing the program instructions, can perform the functions and processes. The memory 1220 can further store other programs or data, such as operating systems, application programs, and the like. The memory 1220 can include non-transitory storage media, such as a read-only memory (ROM), a random-access memory (RAM), a flash memory, a solid-state memory, a hard disk drive, an optical disk drive, and the like.

In an embodiment, the RF module 1230 receives a processed data signal from the processing circuitry 1210 and converts the data signal to beamforming wireless signals that are then transmitted via antenna arrays 1240, or vice versa. The RF module 1230 can include a digital-to-analog converter (DAC), an analog-to-digital converter (ADC), a frequency-up-converter, a frequency-down-converter, filters and amplifiers for reception and transmission operations. The RF module 1230 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1240 can include one or more antenna arrays.

The apparatus 1200 can optionally include other components, such as input and output devices, additional or signal processing circuitry, and the like. Accordingly, the apparatus 1200 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through a physical medium or distributed system, including, for example, from a server connected to the Internet.

The computer program may be accessible from a computer-readable medium providing program instructions for use by or in connection with a computer or any instruction execution system. The computer-readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random-access memory (RAM), a read-only memory (ROM), a magnetic disk and an optical disk, and the like. The computer-readable non-transitory storage medium can include all types of computer-readable medium, including magnetic storage medium, optical storage medium, flash medium, and solid-state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:

receiving a physical uplink control channel (PUCCH) resource configuration from a base station in a subband full duplex (SBFD) system, the PUCCH resource configuration indicating a first frequency domain starting position for PUCCH transmission in SBFD slots and a second frequency domain starting position for PUCCH transmission in non-SBFD slots; and performing periodic or semi-persistent PUCCH transmissions across multiple slots including SBFD slots and non-SBFD slots based on the PUCCH resource configuration received from the base station, the periodic or semi-persistent PUCCH transmissions across the SBFD slots using the first frequency domain starting position, the periodic or semi-persistent PUCCH transmissions across the non-SBFD slots using the second frequency domain starting position, and postponing a PUCCH transmission for all the SBFD slots during the periodic or semi-persistent PUCCH transmissions across the SBFD slots and the non-SBFD slots, wherein the receiving further comprises receiving either:

a bitmap indicating:

a set of slots where a PUCCH resource is applied, a set of slots where a second hop frequency domain position is applied, or a set of slots where skipping or disabling or invalidation is applied, or another bitmap indicating flexible slots that are dynamically reconfigured by a Layer 1 signaling.

2. The method of claim 1, wherein the PUCCH resource configuration indicates one or more PUCCH resources, and the first frequency domain starting position and the second frequency domain starting position are provided in one of the one or more PUCCH resources.

3. The method of claim 1, wherein the PUCCH resource configuration indicates a PUCCH resource set including separate PUCCH resources corresponding to SBFD slots and non-SBFD slots, respectively, and the first frequency domain starting position and the second frequency domain starting position are provided in the separate PUCCH resources included in the PUCCH resource set.

4. The method of claim 1, wherein the SBFD slots and the non-SBFD slots in the multiple slots are configured as part of a SBFD layout configuration, indicated by high-layer parameters, or indicated using a bitmap.

5. The method of claim 1, wherein the PUCCH resource configuration further indicates a first second hop frequency domain starting position for the PUCCH transmission in SBFD slots and a second hop frequency domain position for the PUCCH transmission in non-SBFD slots, the periodic or semi-persistent PUCCH transmissions across the SBFD slots use the first second hop frequency domain starting position, and the periodic or semi-persistent PUCCH transmissions across the non-SBFD slots use the second hop frequency domain starting position.

6. The method of claim 5, wherein the first second hop frequency domain starting position and the second hop frequency domain position are provided in a same PUCCH resource or in separate PUCCH resources in a same PUCCH resource set.

7. The method of claim 1, wherein the performing includes:

skipping a PUCCH frequency hopping for a SBFD slot during periodic or semi-persistent PUCCH transmissions across SBFD slots and non-SBFD slots.

8. The method of claim 1, further comprising:

performing PUCCH repetition transmissions across multiple consecutive slots including SBFD slots and non-SBFD slots based on the PUCCH resource configuration received from the base station, the PUCCH repetition transmissions across the SBFD slots using the first frequency domain starting position, the PUCCH repetition transmissions across the non-SBFD slots using the second frequency domain starting position.

9. The method of claim 8, wherein the PUCCH resource configuration further indicates a first second hop frequency domain starting position for the PUCCH transmission in SBFD slots and a second hop frequency domain position for the PUCCH transmission in non-SBFD slots, the PUCCH repetition transmissions across the SBFD slots use the first second hop frequency domain starting position, and the PUCCH repetition transmissions across the non-SBFD slots use the second hop frequency domain starting position.

10. The method of claim 1, further comprising:

skipping a repetition of a PUCCH transmission in a SBFD slot during PUCCH repetition transmissions across SBFD slots and non-SBFD slots.

11. The method of claim 10, wherein the skipping includes:

postponing the repetition of the PUCCH transmission to a non-SBFD slot.

12. The method of claim 1, further comprising:

receiving a PUCCH resource configuration including a PUCCH resource and a replacement PUCCH resource both having a same identifier;

using one of the PUCCH resource and the replacement PUCCH resource for PUCCH transmission in non-SBFD slots, and using the other one of the PUCCH resource and the replacement PUCCH resource for PUCCH transmission in SBFD slots.

13. A method, comprising:

receiving a sounding reference signal (SRS) configuration from a base station in a subband full duplex (SBFD) system, the SRS configuration indicating a first set of parameters to configure a first frequency domain starting position of SRS transmission in SBFD slots and a second set of parameters to configure a second frequency domain starting position of SRS transmission in non-SBFD slots; and performing periodic or semi-persistent SRS transmissions across multiple slots including SBFD slots and non-SBFD slots based on the SRS configuration received from the base station, the periodic or semi-persistent SRS transmissions across the SBFD slots using the first frequency domain starting position configured according to the first set of parameters, the periodic or semi-persistent SRS transmissions across the non-SBFD slots using the second frequency domain starting position configured according to the second set of parameters, and postponing an SRS transmission for all the SBFD slots during the periodic or semi-persistent SRS transmissions across SBFD slots and non-SBFD slots, wherein the receiving further comprises receiving a bitmap indicating:

a set of slots where an SRS resource is applied, or a set of slots where skipping or disabling or invalidation is applied.

14. The method of claim 13, wherein the SRS configuration indicates an SRS resource, and the first set of parameters to configure the first frequency domain starting position of SRS transmission in SBFD slots and the second set of parameters to configure the second frequency domain starting position of SRS transmission in non-SBFD slots are provided in the SRS resource.

15. The method of claim 14, wherein the SRS resource provides two frequency domain position parameters corresponding to the first set of parameters to configure the first frequency domain starting position of SRS transmission in SBFD slots and the second set of parameters to configure the second frequency domain starting position of SRS transmission in non-SBFD slots, respectively.

16. The method of claim 14, wherein the SRS resource provides two frequency domain shift parameters corresponding to the first set of parameters to configure the first frequency domain starting position of SRS transmission in SBFD slots and the second set of parameters to configure the second frequency domain starting position of SRS transmission in non-SBFD slots, respectively.

17. The method of claim 14, wherein the SRS resource provides two frequency hopping parameters corresponding to the first set of parameters to configure the first frequency domain starting position of SRS transmission in SBFD slots and the second set of parameters to configure the second frequency domain starting position of SRS transmission in non-SBFD slots, respectively.

18. The method of claim 13, wherein the SRS configuration indicates an SRS resource set including separate SRS resources corresponding to SBFD slots and non-SBFD slots, respectively, and the first set of parameters to configure the first frequency domain starting position of SRS transmission in SBFD slots and the second set of parameters to configure the second frequency domain starting position of SRS transmission in non-SBFD slots are provided in the separate SRS resources included in the SRS resource set.

19. The method of claim 13, further comprising:

skipping SRS transmission on resource blocks that are not confined with an uplink subband in a SBFD slot for an SRS having frequency domain resources partially within the uplink subband and partially overlapping a downlink subband in the SBFD slot.

20. The method of claim 13, wherein, for a set of physical resource blocks allocated in an uplink subband in a SBFD slot in the multiple slots, a common resource block (CRB) index of a first PRB and a CRB index following a last PRB are divisible by four.

21. The method of claim 13, wherein the SRS configuration indicates a frequency domain resource configuration that defines SRS frequency domain positions, with and without frequency hopping, to be confined within uplink subbands in SBFD slots.

* * * * *